(12) United States Patent  
Kotaki et al.

(10) Patent No.: US 9,033,188 B2  
(45) Date of Patent: May 19, 2015

(54) MOVABLE DISCHARGE DEVICE FOR USE IN PARTICLE/BULK MATERIAL STORAGE SILO AND PARTICLE/BULK MATERIAL STORAGE SILO

(75) Inventors: Takashi Kotaki, Kobe (JP); Fumio Mori, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 129 days.

(21) Appl. No.: 13/989,934

(22) PCT Filed: Nov. 14, 2011

(86) PCT No.: PCT/JP2011/006343  
§ 371 (c)(1),  
(2), (4) Date: Jul. 3, 2013

(87) PCT Pub. No.: WO2012/070196  
PCT Pub. Date: May 31, 2012

(65) Prior Publication Data  
US 2013/0313286 A1    Nov. 28, 2013

(30) Foreign Application Priority Data  
Nov. 25, 2010    (JP) .................................. 2010-262308

(51) Int. Cl.  
*G01F 11/00*    (2006.01)  
*B65G 65/48*    (2006.01)  
*B65D 88/68*    (2006.01)

(52) U.S. Cl.  
CPC ................ *B65G 65/48* (2013.01); *B65D 88/68* (2013.01); *B65G 65/4836* (2013.01)

(58) Field of Classification Search  
CPC ..... B65G 65/48; B65G 65/4836; B65D 88/68  
USPC ......... 222/217, 196, 197, 199, 342, 347, 410, 222/367–370, 561; 239/681–689  
See application file for complete search history.

(56) References Cited

U.S. PATENT DOCUMENTS 4,361,254 A * 11/1982 Teraoku et al. ................ 222/196  
4,415,102 A * 11/1983 Teske .............................. 222/411  
5,375,747 A * 12/1994 Yoshikawa et al. ........... 222/410

FOREIGN PATENT DOCUMENTS

DE             476851 C1    5/1929  
JP         A-61-235325      10/1986

(Continued)

OTHER PUBLICATIONS

International Search Report issued in International Patent Application No. PCT/JP2011/006343 mailed Feb. 14, 2012.

*Primary Examiner* — Lien Ngo  
(74) *Attorney, Agent, or Firm* — Oliff PLC (57) ABSTRACT

A movable discharge device for use in a particle/bulk material storage silo includes: a travel body configured to travel along a groove provided at a lower portion of a storage silo; a scrape-out unit configured to move integrally with the travel body and including a blade configured to rotate above the groove to rake coals in the storage silo and scrape out the coals to the groove; and a groove closing mechanism configured to close a predetermined region of the groove within a rotation trajectory region of the blade. The discharge device is configured to be able to suppress the change in the discharge amount of coals discharged by the blade from the particle/bulk material storage silo.

7 Claims, 11 Drawing Sheets

(56) References Cited

FOREIGN PATENT DOCUMENTS

| JP | U-6-32433 | 4/1994 |
| JP | A-7-309448 | 11/1995 |
| JP | A-10-273230 | 10/1998 |
| JP | A-2005-206364 | 8/2005 |

* cited by examiner

MOVABLE DISCHARGE DEVICE FOR USE IN PARTICLE/BULK MATERIAL STORAGE SILO AND PARTICLE/BULK MATERIAL STORAGE SILO

TECHNICAL FIELD

The present invention relates to a movable discharge device in a silo configured to store particle/bulk material, such as coals, coke, or limestone, and a particle/bulk material storage silo including the movable discharge device.

BACKGROUND ART

Conventionally, in a silo for storing particle/bulk material, such as coals, coke, or limestone, a discharge device is provided at a cone portion formed at a lower portion of the storage silo, and the particle/bulk material are discharged by the discharge device to a belt conveyor provided at a lower side of the storage silo. The particle/bulk material discharged to the belt conveyor is conveyed by the belt conveyor to a predetermined place outside the storage silo.

For example, in a large-scale storage silo in a thermal power facility, the cone portion is provided to extend from one end portion to the other end portion of the storage silo, a groove through which the particle/bulk material in the storage silo are discharged is formed at a lower portion of the cone portion, and a movable discharge device configured to move along the groove is provided to discharge the particle/bulk material. The belt conveyor is provided along and under the groove, and the particle/bulk material are conveyed by the belt conveyor to the predetermined place.

One example of such a movable discharge device is configured such that: stored substances at a lower portion of the storage silo are raked by a blade curved in an arch shape and configured to rotate in a horizontal plane; and the stored substances are discharged through the groove to the belt conveyor. The movable discharge device moves in the storage silo to discharge the stored substances. With this, a significant storage difference (nonuniform height) of the stored substances in the storage silo is not generated.

Figure 11:
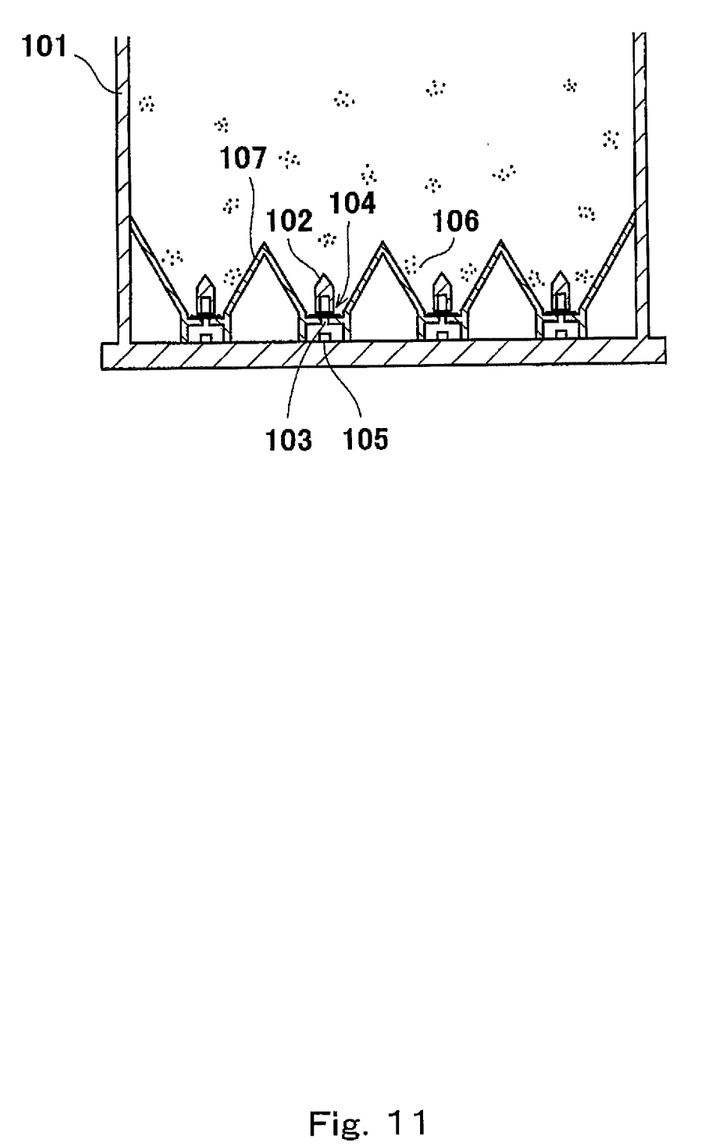
FIG. 11 is a cross-sectional view showing one example of a conventional reserve silo.

One example of this type of conventional art is that as shown in FIG. 11, a plurality of chutes 107 and a plurality of cone portions 102 are provided at a bottom of a large-diameter reserve silo 101, and sweep-out devices 104 are configured to respectively travel along grooves 103 formed at lower ends of the chutes 107. Each of the sweep-out devices 104 travels along the groove 103 to sweep out particle/bulk material 106 from an inside of the silo 101 to a conveyor 105 provided under the chute 107 (see PTL 1, for example).

Another conventional art is that in order that reserved substances in a reserve silo can be supplied to a sweep-out device without causing clogging, a hopper at a lower end of the silo is formed to have an oval shape, a flat bottom plate having an oval shape is provided at a lower end opening portion of the hopper to once receive the reserved substances in the silo, and the reserved substances on the flat bottom plate in the silo are swept down by the rotation of a horizontal rotating arm through a sweep-out opening portion of the flat bottom plate to the sweep-out device located at a lower side (see PTL 2, for example).

CITATION LIST

Patent Literature

PTL 1: Japanese Laid-Open Utility Model Application Publication No. 6-32433

PTL 2: Japanese Laid-Open Patent Application Publication No. 61-235325

SUMMARY OF INVENTION

Technical Problem

In the case of raking and discharging the stored substances by the blade rotating in the horizontal plane as described above, a large amount of stored substances is discharged through the groove when the blade is located at a position above the groove, but the amount of stored substances discharged through the groove decreases when the blade is located at a position other than the position above the groove. Thus, the discharge amount of stored substances significantly varies depending on the rotational position of the blade.

Figure 12:
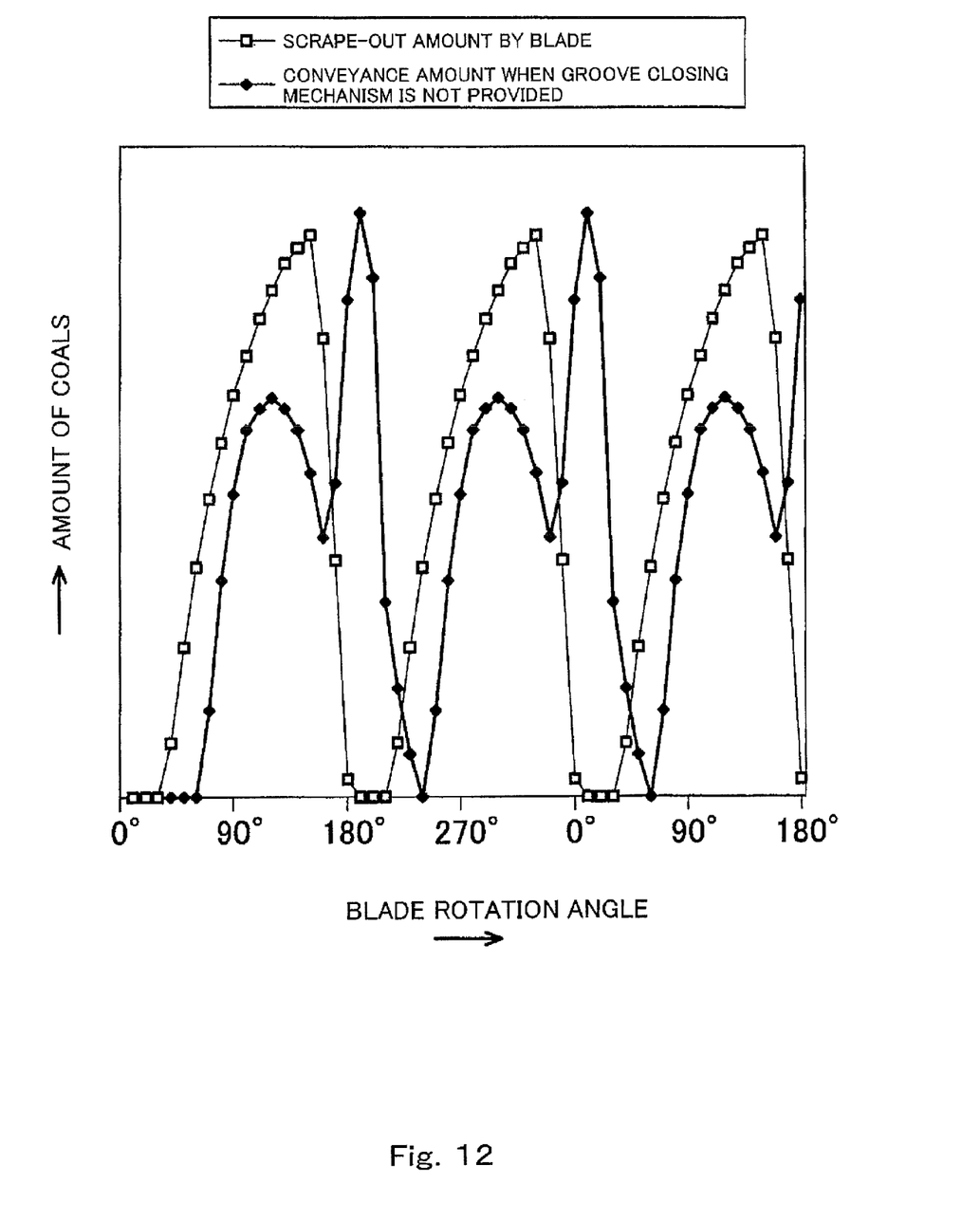
FIG. 12 is a graph showing predictions regarding the change in the scrape-out amount and the change in the conveyance amount due to the conventional discharge device.

FIG. 12 is a graph showing a discharge amount (hereinafter may be referred to as a "scrape-out amount") of the blade and a conveyance amount of the belt conveyor in the case of the discharge device configured to discharge the stored substances (coals) by using two blades. FIG. 12 shows the change in the scrape-out amount and the change in the conveyance amount in a case where the blades are rotated from a state where the blades are being stopped at a position above the groove. A horizontal axis denotes a blade rotation angle, and a vertical axis denotes the change in a particle/bulk material amount (coal amount).

As shown in FIG. 12, at the start of the rotation, the discharge amount is zero. However, when the particle/bulk material are raked by front surfaces of the blades and the amount of particle/bulk material raked reaches a specific amount, the discharge amount starts increasing. This is because the particle/bulk material pushed by the particle/bulk material raked by the blades is discharged through the groove. Immediately before the two blades are located above the groove, the scrape-out amount becomes maximum. When the blades pass through the position above the groove, the scrape-out amount becomes zero. In this example, since two blades are provided so as to be opposed to each other about a rotation axis, the scrape-out amount changes as above every 180 degrees.

The conveyance amount of the belt conveyor increases a little behind the increase in the scrape-out amount of the blade. In a case where the specific amount of particle/bulk material pushed by the particle/bulk material raked by the blades is scraped out through the groove, the conveyance amount slightly decreases when the blades are rotated by about 120 degrees. This is because the particle/bulk material is raked in a direction parallel to the groove depending on the angle of each blade. After that, the particle/bulk material raked at the arched curved portion starts being discharged through the groove, and the conveyance amount increases. The maximum amount of particle/bulk material is conveyed when two blades are located above the groove. Then, the conveyance amount of the belt conveyor becomes minimum until a predetermined amount of particle/bulk material is raked by the blades. When the predetermined amount of particle/bulk material are raked again by the blades as described above, the conveyance amount of the belt conveyor increases a little behind the increase in the scrape-out amount of the blades.

In this example, since two blades are provided so as to be opposed to each other about the rotation axis, the conveyance amount of the belt conveyor also changes as above every 180 degrees. Therefore, when the blades are located above the groove, the particle/bulk material scraped out onto the belt conveyor forms a large heap.

As above, when the blades pass through the position above the groove, a large amount of particle/bulk material are scraped out to the groove, so that a large amount of particle/bulk material are temporarily loaded onto the belt conveyor. In addition, depending on a conveyance speed of the belt conveyor, the particle/bulk material scraped out by the blade located at a conveying-direction downstream side may be loaded onto the particle/bulk material scraped out by the blade located at a conveying-direction upstream side. In this case, a larger heap of particle/bulk material is partially formed on the belt conveyor.

The conveyance amount of particle/bulk material on the belt conveyor is restricted by a gate portion provided at the conveying-direction downstream side of the belt conveyor. The particle/bulk material of the above-described large heap temporarily stays at the gate portion. The particle/bulk material, the conveyance amount of which is restricted by the gate portion, may fall when passing through the gate portion. Further, if a large amount of particle/bulk material are temporarily scraped out, the particle/bulk material temporarily stay in the hopper, and a part of the particle/bulk material adhere to the hopper, so that some particle/bulk material are not conveyed.

These problems cannot be solved by PTLs 1 and 2.

Generally, the amount of particle/bulk material discharged from the storage silo differs depending on facilities. Therefore, a facility capable of flexibly deal with the change in the discharge amount is desired.

Solution to Problem

Here, an object of the present invention is to provide a discharge device capable of suppressing a change in a discharge amount of particle/bulk material discharged from a particle/bulk material storage silo by using a blade.

To achieve the above object, a movable discharge device for use in a particle/bulk material storage silo according to the present invention is a movable discharge device for use in a particle/bulk material storage silo, the movable discharge device being configured to travel along a groove provided at a lower portion of the storage silo and discharge particle/bulk material in the storage silo downward through the groove, the movable discharge device including: a travel body configured to travel along the groove; a scrape-out unit configured to move integrally with the travel body and including a blade configured to rotate above the groove to rake the particle/bulk material in the storage silo by a rotational-direction front surface of the blade and scrape out the particle/bulk material to the groove; and a groove closing mechanism configured to close a predetermined region of the groove within a rotation trajectory region of the blade. With this configuration, in a case where the blade is rotated above the groove provided at the lower portion of the storage silo to scrape out the stored substances to the groove, the opening area of the groove is adjusted by the groove closing mechanism. With this, the particle/bulk material raked by the blade is gradually discharged through the opening portion. Therefore, the particle/bulk material can be stably discharged while suppressing the change in the discharge amount of particle/bulk material scraped out to the groove.

The blade may be one of two blades provided so as to be symmetrical about a rotational center of the blades, the groove closing mechanism may include groove closing plate sets configured to respectively close conveying-direction front and rear portions of the groove within the rotation trajectory region of the blades, and each of the groove closing plate sets may be constituted by a plurality of groove closing plates that close the predetermined region of the groove. In the present description and claims, the "conveying direction" corresponds to a "traveling direction" of the discharge device. In addition, traveling-direction front and rear portions of the discharge device are also referred to as "front and rear portions". With this configuration, the closed area of the groove can be changed by changing the number of groove closing plates arranged. Thus, the opening area of the groove can be easily adjusted depending on the type of particle/bulk material, the discharge amount, and the like.

Each of the groove closing plate sets may be constituted by a plurality of groove closing plates having different areas for closing the groove from one another. With this configuration, the closed area of the groove can be easily changed by attaching or detaching the groove closing plates for closing the groove or changing the arrangement of the groove closing plates. Thus, the discharge amount of particle/bulk material can be adjusted.

The groove closing plate sets may be configured to respectively have such sizes that opening areas are respectively formed at conveying-direction front and rear positions of the rotational center of the blades so as to be symmetrical about the rotational center. With this configuration, the amount of particle/bulk material scraped out to the groove by the blade at the conveying-direction front position and the amount of particle/bulk material scraped out to the groove by the blade at the conveying-direction rear position can be set to be substantially the same as each other. Thus, the discharge amount of particle/bulk material scraped out by the blade at the conveying-direction front position and the discharge amount of particle/bulk material scraped out by the blade at the conveying-direction rear position can be set to be the same as each other depending on the property of the particle/bulk material.

Each of the groove closing plate sets may be constituted by groove closing plates having such sizes that a predetermined opening area is formed at an arbitrary position within the rotation trajectory region of the blades. With this configuration, the amount of particle/bulk material scraped out at the conveying-direction front position of the blade and the amount of particle/bulk material scraped out at the conveying-direction rear position of the blade can be set to be different from each other. Thus, the discharge amount of particle/bulk material scraped out at the conveying-direction front position of the blade and the discharge amount of particle/bulk material scraped out at the conveying-direction rear position of the blade can be set to be different from each other depending on the property of the particle/bulk material, and the like.

The groove closing plate sets may include leakage preventing plates respectively located at conveying-direction front and rear ends and projecting upward from upper surfaces of the groove closing plate sets. With this configuration, the groove closing mechanism can prevent the particle/bulk material from being discharged to the groove from conveying-direction front and rear end portions of the groove closing plate sets.

A particle/bulk material storage silo according to the present invention includes any one of the above movable discharge devices each for use in a particle/bulk material storage silo. With this configuration, the storage silo permitting stable conveyance of the particles/bulk materials can be configured while suppressing the change in the discharge amount of particle/bulk material discharged from the storage silo to the belt conveyor.

Advantageous Effects of Invention

According to the present invention, the change in the discharge amount of particle/bulk material discharged from the storage silo can be suppressed. Therefore, the conveyance of the particle/bulk material by the belt conveyor can be stabilized.

BRIEF DESCRIPTION OF DRAWINGS

[FIG. 1]

[FIG. 2]

[FIG. 3]

[FIG. 4]

[FIG. 5A and 5B]

[FIG. 6]

[FIG. 7]

[FIGS. 8A to 8C]

[FIGS. 9A to 9C]

[FIG. 10]

[FIG. 11]

[FIG. 12]

DESCRIPTION OF EMBODIMENTS

Hereinafter, an embodiment of the present invention will be explained based on the drawings. The embodiment below will be explained using the above-described large-scale storage silo 101 shown in FIG. 11 as an example and coals as the particle/bulk material. In addition, the following will explain an example in which in a movable discharge device 1, two blades are provided so as to be symmetrical about a rotation axis such that the blades can be stored, that is, located under the cone portion located above the groove when the movable discharge device 1 moves among a plurality of silos. Regarding the storage silo, the same reference signs are used for the same components as in FIG. 11 in the following explanation.

Figure 1:
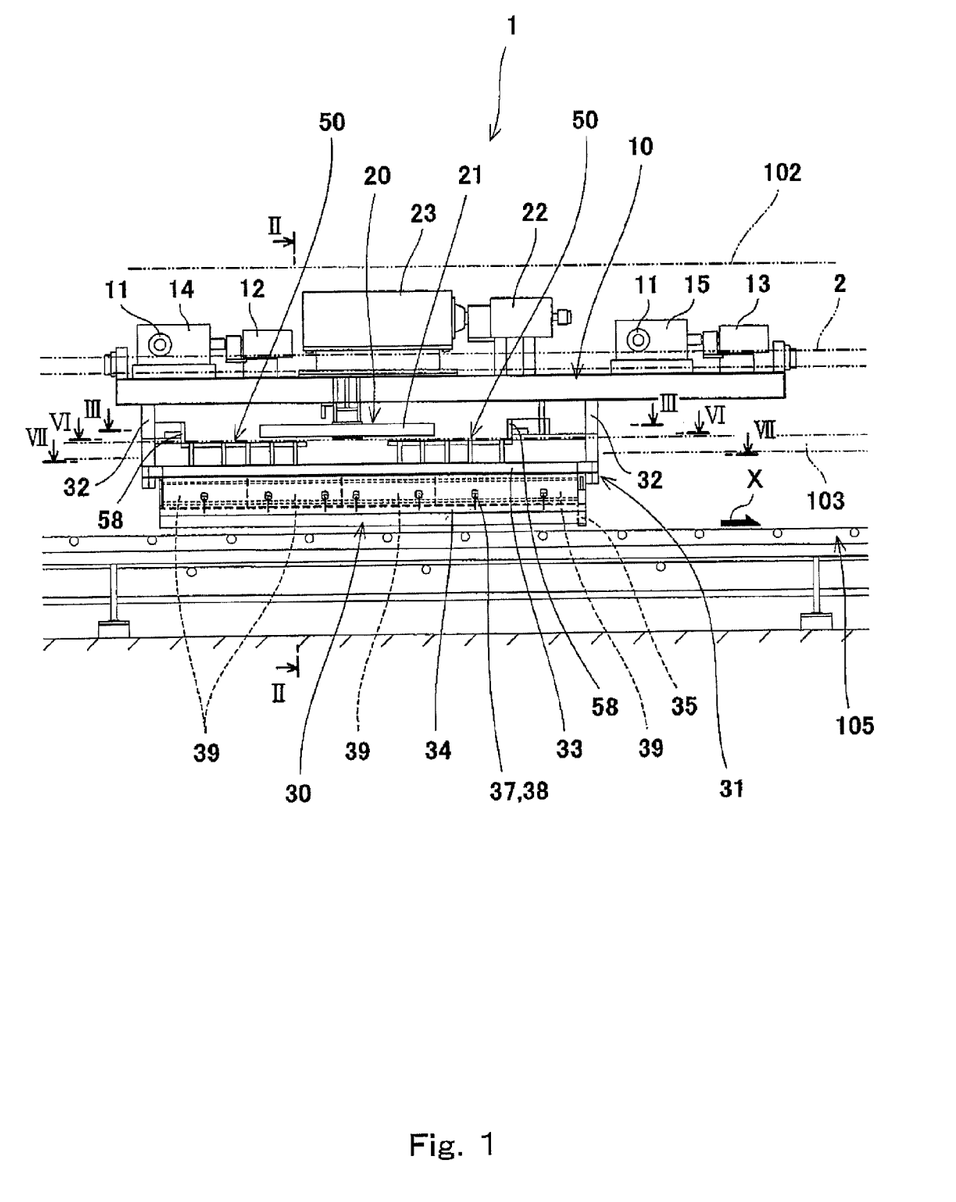
FIG. 1 is a side view of a discharge device according to Embodiment 1 of the present invention.
Figure 2:
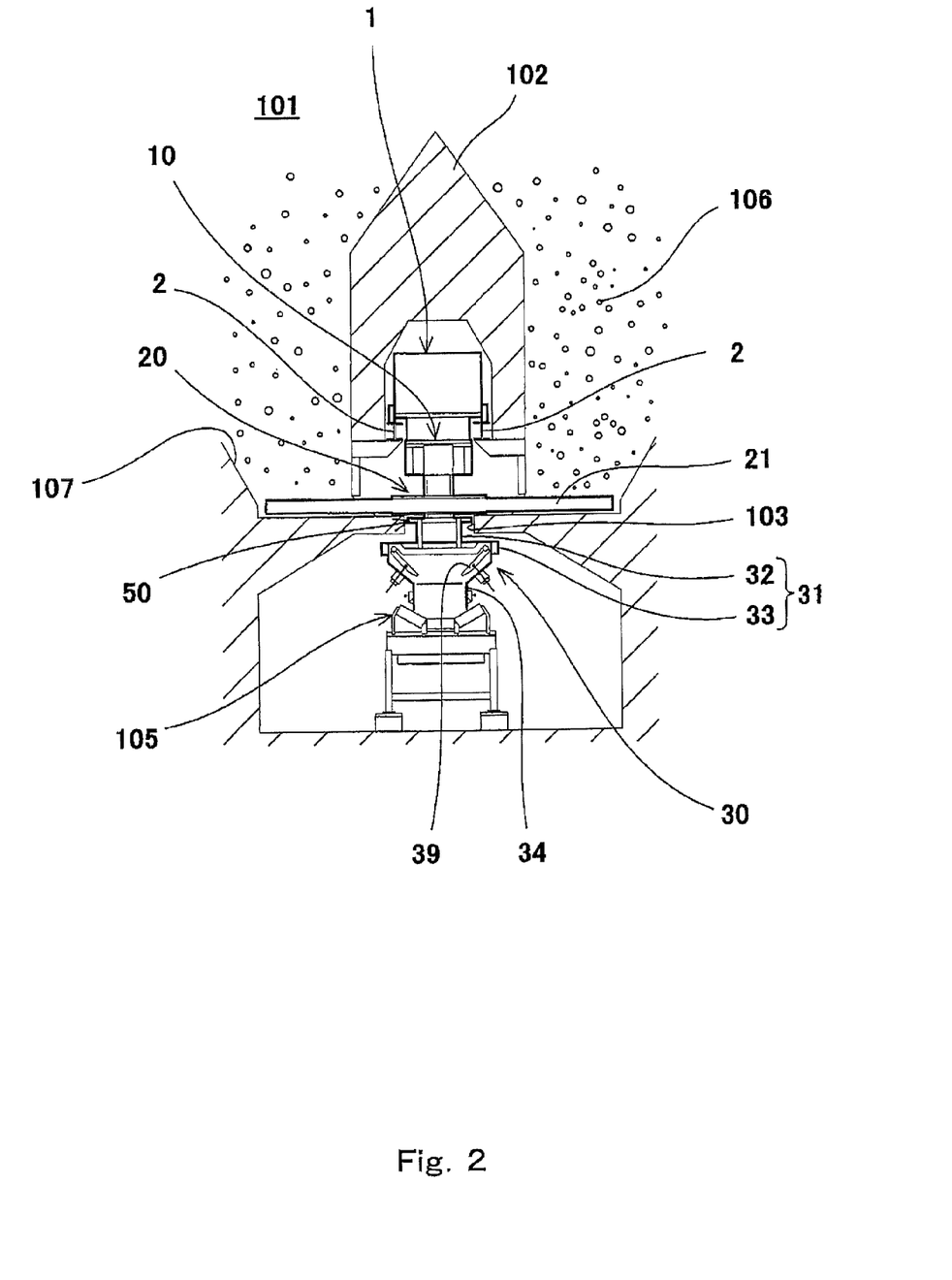
FIG. 2 is a cross-sectional view taken along line II-II of FIG. 1.

As shown in FIGS. 1 and 2, the cone portion 102 extending in the conveying direction is provided at the position of the chute 107 provided at a lower portion of the storage silo 101, and the movable discharge device 1 configured to travel along the cone portion 102 in a conveying direction X is provided inside the cone portion 102. As shown in FIG. 2, the cone portion 102 is configured such that coals (particle/bulk material) 106 stored in the storage silo 101 are stored at a predetermined repose angle at which the coals 106 are not naturally discharged through the groove 103. The coals 106 stored in the storage silo 101 are stably stored therein until the coals 106 are forcibly discharged by the movable discharge device 1.

As shown in FIGS. 1 and 2, the movable discharge device 1 includes a travel body 10 including wheels 11 for traveling on a rail 2 provided at the cone portion 102. The wheels 11 of the travel body 10 are respectively driven by a reducer 14 driven by a driving machine 12 provided at a conveying-direction front position and a reducer 15 driven by a driving machine 13 provided at a conveying-direction rear position, and the travel body 10 travels on the rail 2 by the drive control of the wheels 11.

Further, the groove 103 extending in the same direction as the cone portion 102 is provided at a lower portion of the cone portion 102. The belt conveyor 105 configured to convey the coals 106 scraped out through the groove 103 is provided under the groove 103 so as to extend in the same direction as the groove 103.

A scrape-out unit 20 configured to move integrally with the travel body 10 and scrape out the coals 106 in the storage silo 101 through the groove 103 is provided at the travel body 10. Blades 21 are provided at the scrape-out unit 20. Each of the blades 21 is curved in an arch shape, and a middle portion of a rotational-direction front side of the blade 21 is concave. The blades 21 rotate in a horizontal plane at a position which is located above a storage lower surface of the storage silo 101 by a predetermined distance, to be specific, a position which permits the blades 21 to scrape out the coals 106 at a position slightly, upwardly spaced apart from an upper end of the groove 103. Power generated by a driving machine 22 provided at the travel body 10 is reduced by a reducer 23, and the blades 21 are rotated around a vertical shaft provided at a rotational center 24.

The movable discharge device 1 is provided with a hopper 30 configured to cause the coals 106, scraped out by the blades 21 through the groove 103, to fall onto the belt conveyor 105. The hopper 30 is provided so as to extend in the conveying direction of the travel body 10 and to cover a rotation region of the blades 21. The hopper 30 is being divided into a plurality of parts (in this example, four parts) in the conveying direction. The hopper 30 is suspended by a suspending frame 31 provided at the travel body 10. The suspending frame 31 includes suspending members 32 respectively provided at front and rear end portions of the travel body 10 and a hopper frame 33 provided between the suspending members 32. A hopper main body 34 is provided at a lower portion of the hopper frame 33. A hopper gate 35 configured to restrict the amount of coals 106 on the belt conveyor 105 is provided at a conveying-direction downstream end portion of the hopper main body 34. The hopper gate 35 flattens the amount of coals 106, loaded through the hopper 30 onto the belt conveyor 105, to transfer the coals in the conveying direction X. A plurality of hopper gates 35 may be provided in the conveying direction.

Figure 3:
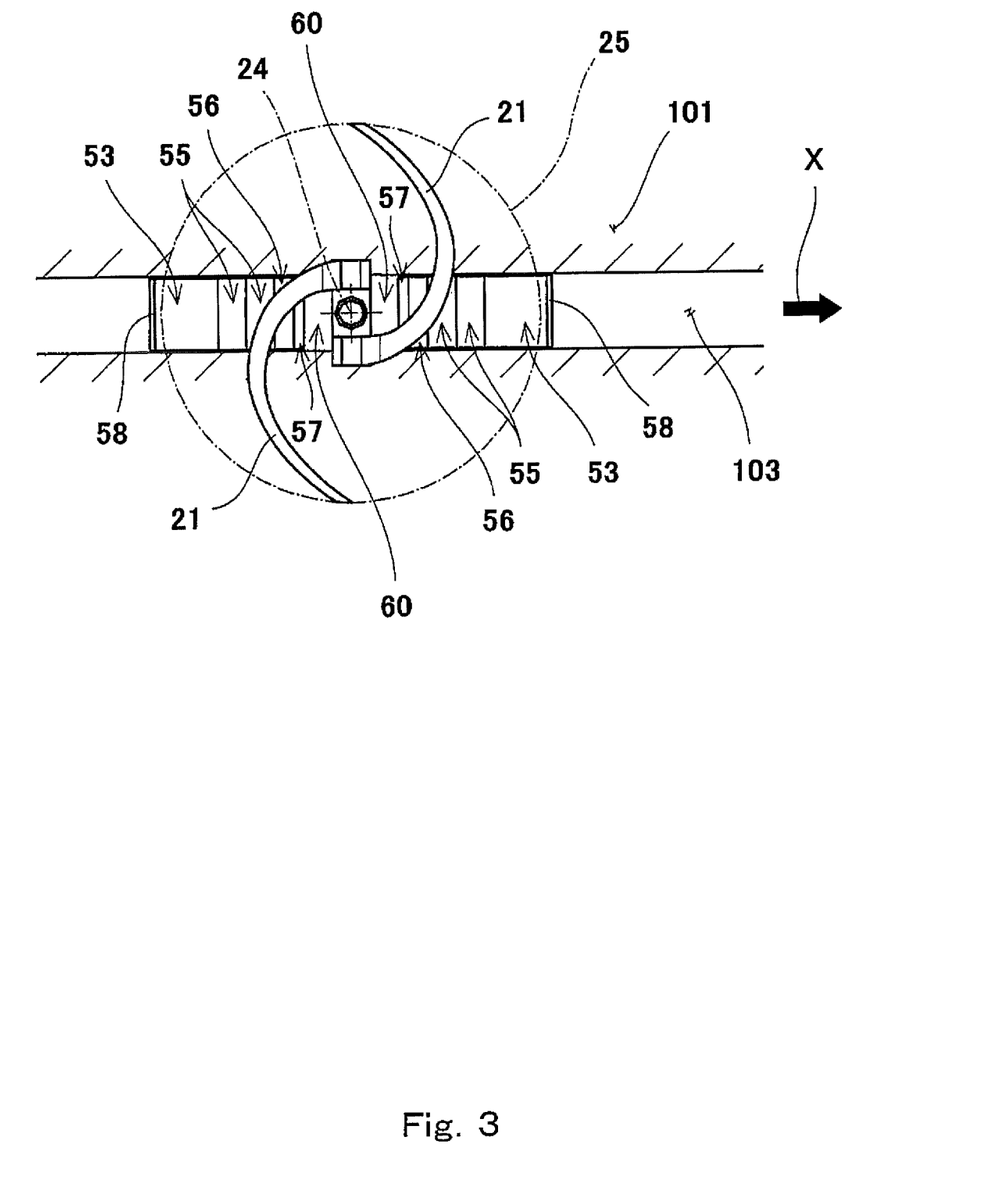
FIG. 3 is a diagram when viewed from a direction indicated by arrows III of FIG. 1.

As shown in FIGS. 1 and 3, groove closing mechanisms 50 configured to close the groove 103 within a rotation trajectory region 25 of the blades 21 are provided at the hopper 30. As shown in FIG. 3, the groove closing mechanisms 50 can close conveying-direction front and rear portions at sides of the rotation trajectory region 25 of the blades 21 to adjust opening amounts of the conveying-direction front and rear portions of the rotational center 24 of the blades 21. In the present embodiment, in order that opening portions 60 each having a predetermined size are respectively formed at conveying-direction front and rear positions of the rotational center 24 of the blades 21, groove closing plates 53, 55, 56, and 57 are provided in series at conveying-direction front and rear positions of each of the opening portions 60. According to the groove closing mechanism 50, as described below, a part of the coals 106 raked by the blades 21 are loaded onto the groove closing plates 53, 55, 56, and 57 and are discharged through the groove 103 a while later. Therefore, the change in the amount of coals 106 discharged through the groove 103 can be suppressed.

In this example, leakage preventing plates 58 are respectively provided at conveying-direction front and rear ends of the groove closing plates 53. Each of the leakage preventing plates 58 is formed on an upper surface of the groove closing plate 53 so as to have a height higher than the heights of the blades 21. In this example, the leakage preventing plates 58 are provided at the groove closing plates 53. However, the leakage preventing plates 58 may be provided at the suspending members 32 or the travel body 10.

Figure 4:
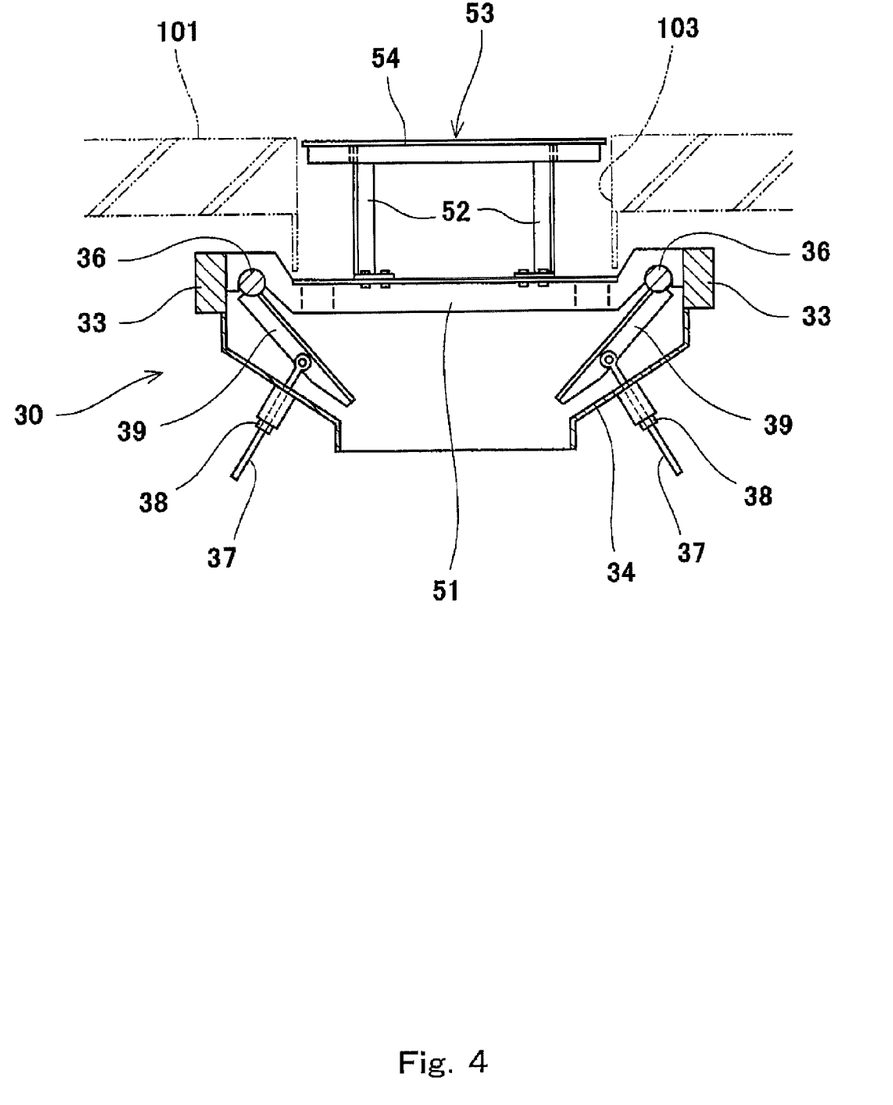
FIG. 4 is an enlarged cross-sectional view of a hopper portion shown in FIG. 2.

As shown in FIG. 4, the hopper frame 33 is a rectangular frame. Hopper support shafts 36 each extending in the conveying direction are provided at the hopper frame 33. Each of the hopper support shafts 36 has a circular pipe-shaped cross section. Upper end portions of baffle plates 39 are respectively fixed to lower portions of the hopper support shafts 36. In the present embodiment, the baffle plate 39 is pivotably supported by the hopper support shaft 36 by fixing the upper end portion of the baffle plate 39 to the hopper support shaft 36, and the angle of a lower portion of the baffle plate 39 can be adjusted in a direction perpendicular to the conveying direction X. The angle of the baffle plate 39 is adjusted in such a manner that a position at which an angle adjusting rod 37 is fixed to the hopper main body 34 is adjusted by a fixing nut 38.

A support bracket 51 extending in a width direction of the groove 103 is provided at the hopper support shafts 36. The groove closing mechanisms 50 are provided on the support bracket 51 supported by the hopper support shafts 36. The groove closing plates 53, 55, 56, and 57 of each of the groove closing mechanisms 50 include leg members 52 fixed to the support bracket 51. The groove closing plate 53 is provided at a position downwardly spaced apart from the lower ends of the blades 21 by a predetermined distance.

Figure 5A:
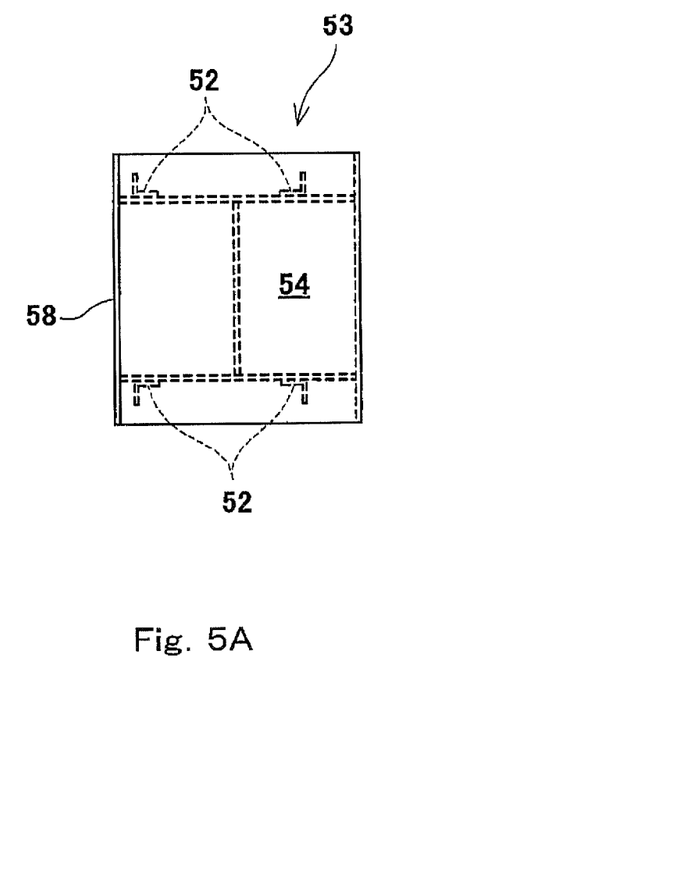
FIG. 5A is a plan view showing one type of groove closing plate shown in FIG. 1.
Figure 5B:
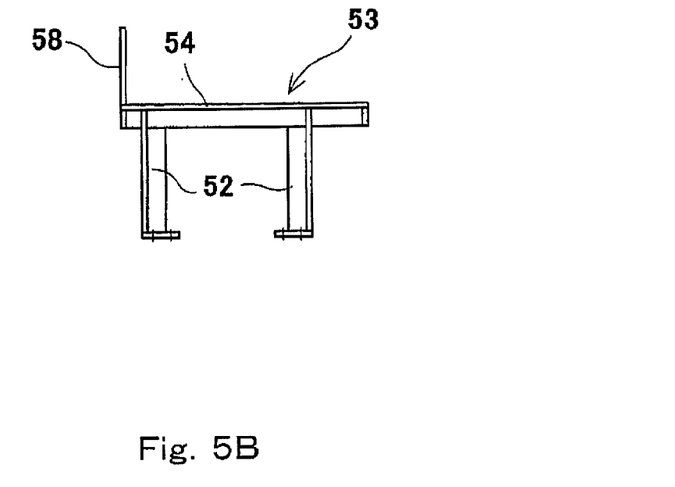
FIG. 5B is a side view thereof.

As shown in FIGS. 5A and 5B, the groove closing plate 53 is configured such that a rectangular plate member 54 having a predetermined size is provided on upper ends of the leg members 52. By fixing the leg members 52 to the support bracket 51, the upper surface of the plate member 54 closes a predetermined area of the groove 103. A width-direction size of the plate member 54 is slightly smaller than a width size of the groove 103 such that a predetermined space is formed between the plate member 54 and the groove 103. By forming the space between the plate member 54 and the groove 103, the travel body 10 is prevented from contacting the groove 103 when the travel body 10 moves in a longitudinal direction of the groove 103. Each of FIGS. 5A and 5B shows the groove closing plate 53 that is the largest among the groove closing plates 53, 55, 56, and 57 shown in FIG. 3. In addition, the leakage preventing plate 58 is provided at the conveying-direction front or rear end of the groove closing plate 53.

Figure 6:
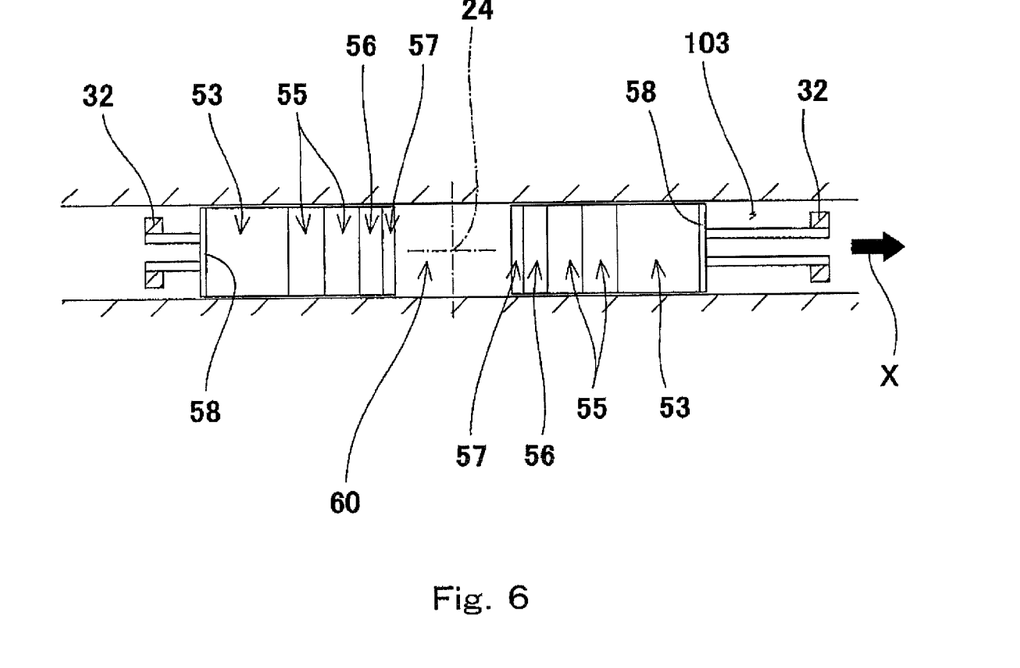
FIG. 6 is a diagram when viewed from a direction indicated by arrows VI of FIG. 1.

As shown in FIG. 6, each of the groove closing mechanisms 50 of the present embodiment includes the groove closing plates 53, 55, 56, and 57 different in conveying-direction size from one another. By setting multiple types of the conveying-direction sizes of the groove closing plates 53, 55, 56, and 57 as above, a closed area of the groove 103 can be changed by changing a combination of the groove closing plates 53, 55, 56, and 57 as described below. With this, the discharge amount of coals 106 can be easily adjusted to the discharge amount suitable for each facility.

Figure 7:
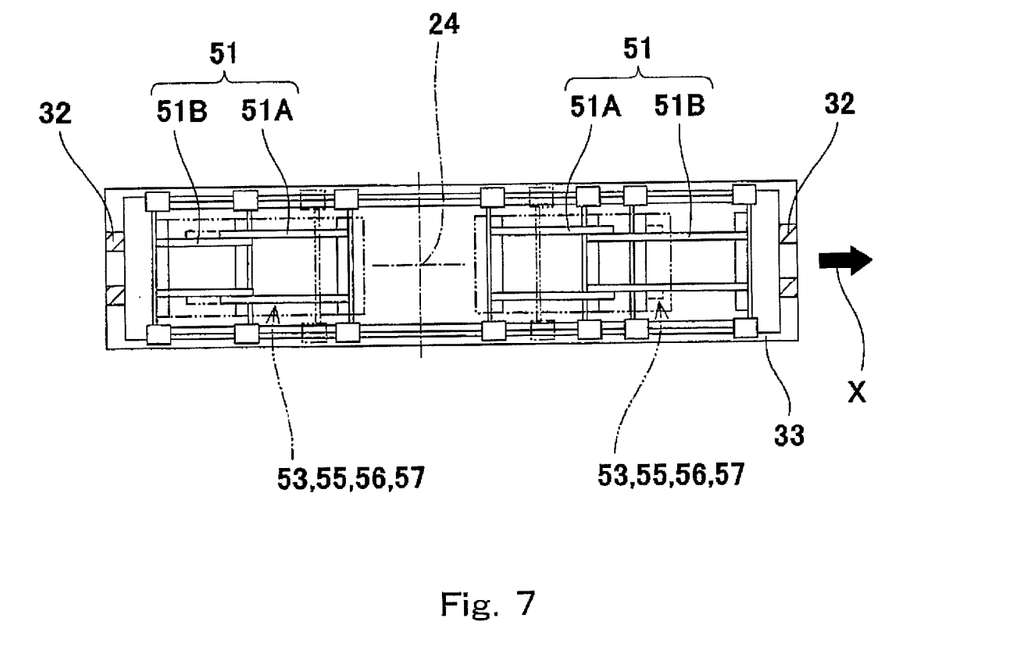
FIG. 7 is a diagram when viewed from a direction indicated by arrows VII of FIG. 1.

As shown in FIG. 7, the groove closing plates 53, 55, 56, and 57 are fixed to the support bracket 51 provided at the travel body 10. In this example, the support bracket 51 is constituted by a support bracket 51A whose position is adjustable in the conveying direction X and a support bracket 51B whose position is fixed. By causing the support bracket 51A located closer to the rotational center 24 of the blades 21 to move in the conveying direction X, the groove closing plates 53, 55, 56, and 57 whose arrangement is changed as below can be supported.

Figure 8A:
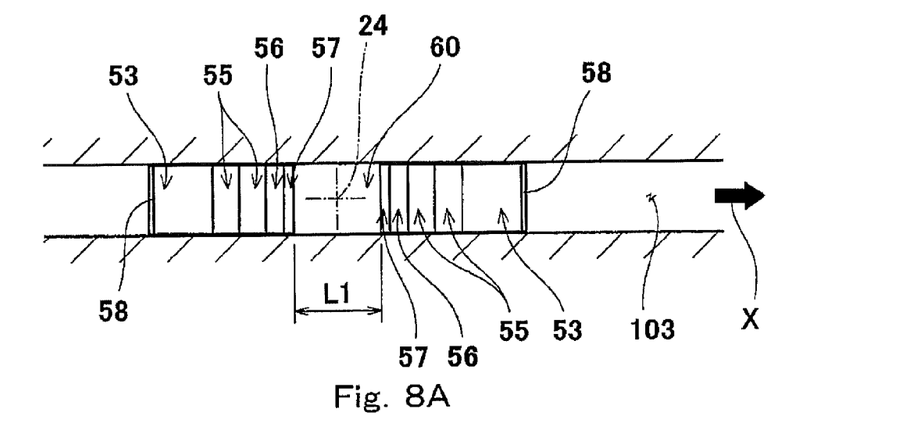
FIGS. 8A to 8C are plan views showing examples of a combination of the groove closing plates of the discharge device shown in FIG. 3.
Figure 8B:
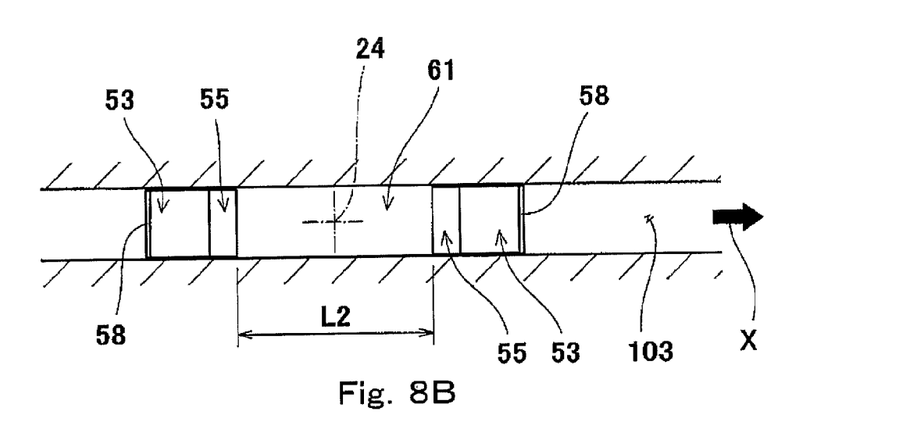
Figure 8C:
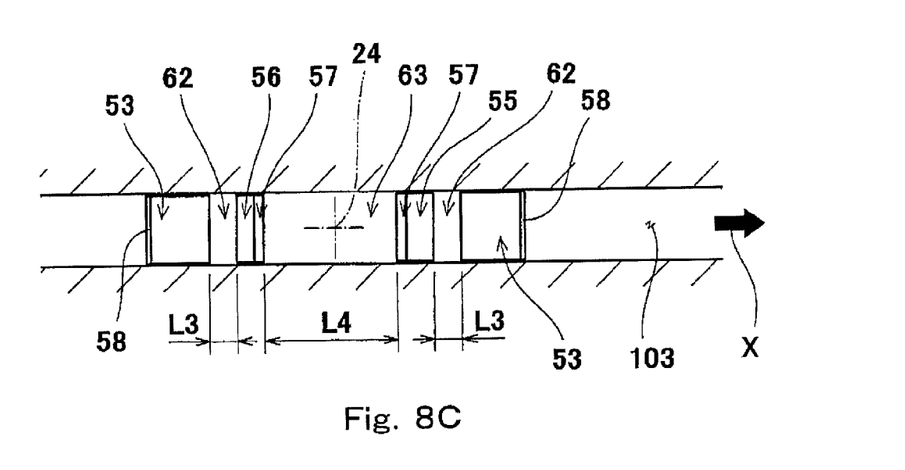

FIGS. 8A to 8C show examples of the combination of the above four types of groove closing plates 53, 55, 56, and 57. In this example, a part of examples of the combination will be explained, but the other combination may be adopted. The number of types of the groove closing plates 53, 55, 56, and 57 may be larger or smaller than four. In such a case, those groove closing plates may be combined arbitrarily.

The example shown in FIG. 8A is that the opening portion 60 having a predetermined area is secured at a position close to the rotational center 24 of the blades 21 (FIG. 3). In this example, the opening portion 60 has a length L1, that is, a smallest area, and the discharge amount of coals with respect to the amount of coals raked by the blades 21 is small. Therefore, this example is suitable for a case where the conveyance amount of the belt conveyor 105 is small. In this case, the coals 106 raked on the groove closing plates 53, 55, 56, and 57 are gradually discharged at front and rear positions of the blades 21. Therefore, the change in the amount of coals discharged onto the belt conveyor 105 is small. Thus, the coals can be conveyed while suppressing the change in the amount of coals on the belt conveyor 105.

The example shown in FIG. 813 is that: the groove closing plates 56 and 57 located close to the rotational center 24 of the blades 21 and one of the groove closing plates 55 are detached; and an opening portion 61 has a length L2, that is, a larger area than that shown in FIG. 8A. In this example, since the opening area is large, the amount of coals 106 raked by the blades 21 and gradually discharged through the groove 103 becomes large. Therefore, this example is suitable for a case where the conveyance amount of the belt conveyor 105 is large. In this case, the coals 106 raked on the groove closing plates 53 and 55 are gradually discharged at the front and rear positions of the blades 21. Therefore, the coals can be easily conveyed while suppressing the change in the amount of coals discharged onto the belt conveyor 105.

The example shown in FIG. 8C is that: in an upstream position of the blades 21, two groove closing plates 55 are detached, and the groove closing plates 56 and 57 are moved in an upstream direction by a distance corresponding to the size of one groove closing plate 55; in a downstream position of the blades 21, one groove closing plate 55 and the groove closing plate 56 are detached, and the groove closing plate 57 is moved in a downstream direction by a distance corresponding to the size of the groove closing plate 56; and these plates are fixed to the support bracket 51. In this example, the opening area on the upstream side of the rotational center 24 of the blades 21 and the opening area on the downstream side thereof are different from each other. With this arrangement, the coals 106 discharged at the front position of the blades 21 and the coals 106 discharged at the rear position of the blades 21 may be differed in terms of time. In this case, the discharge amount and time of coals 106 raked by the blades 21 and discharged to the groove 103 at the front position and the discharge amount and time of coals 106 raked by the blades 21 and discharged to the groove 103 at the rear position can be differed according to need. With this, the discharge amount and time of coals discharged through the groove 103 is adjusted depending on, for example, the conveyance speed of the belt conveyor 105. Thus, the coals can be conveyed while further suppressing the change in the amount of coals discharged onto the belt conveyor 105.

Each of the arrangements of the groove closing plates 53, 55, 56, and 57 shown in FIGS. 8A to 8C is just one example. Depending on use conditions and the like, the sizes (areas) of the opening portions 60, 61, 62, and 63 and the positions of the opening portions 62 and 63 can be arbitrarily adjusted by attaching or detaching the groove closing plates 53, 55, 56, and 57 and changing the positions of the groove closing plates 53, 55, 56, and 57.

Figure 9A:
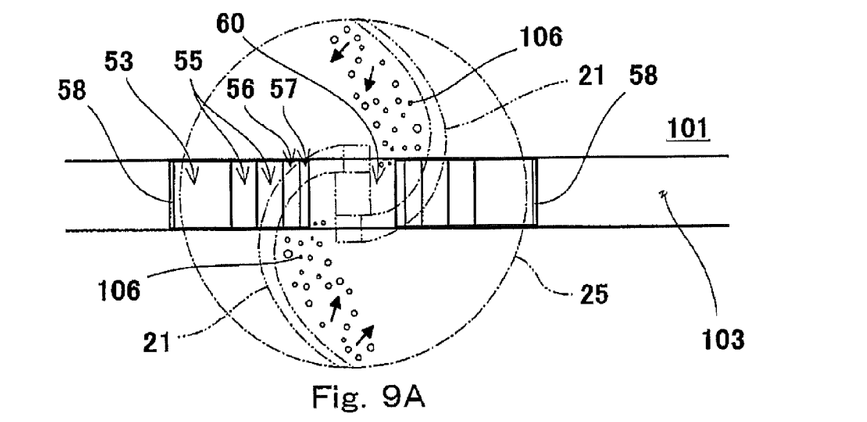
FIGS. 9A to 9C are plan views showing the change in the scrape-out amount of coals in the state of the groove closing plates of the discharge device shown in FIG. 3.
Figure 9B:
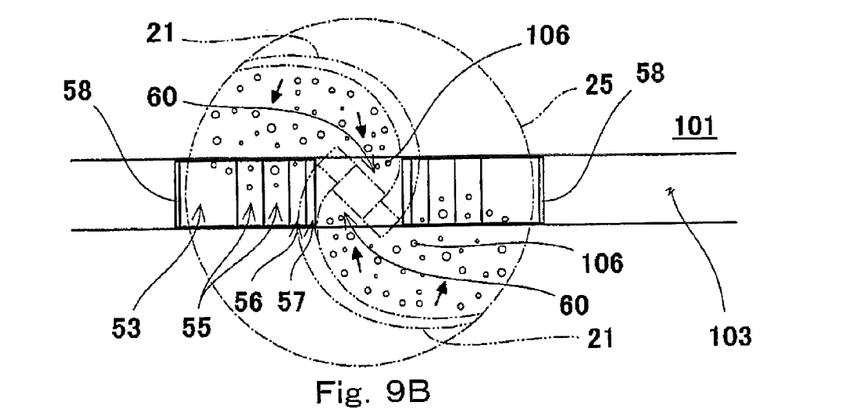
Figure 9C:
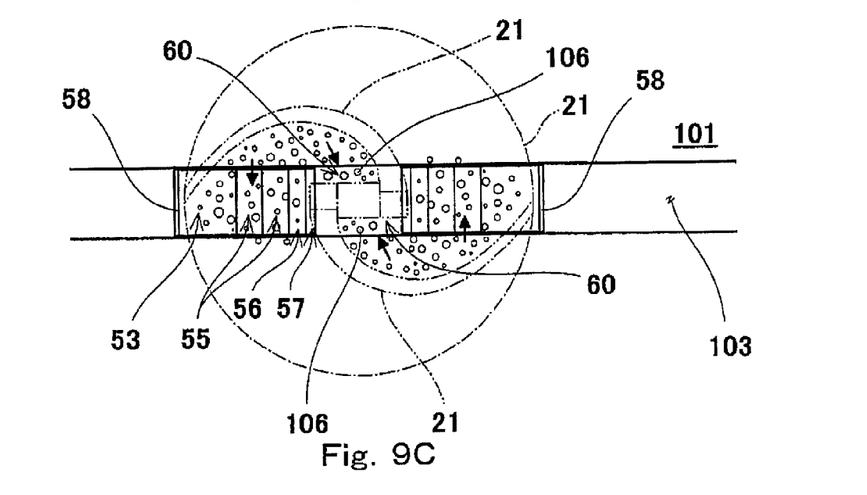

FIGS. 9A to 9C are plan views schematically showing the change in the scrape-out amount in the case of the arrangement of the groove closing plates 53, 55, 56, and 57 shown in FIG. 8A.

FIG. 9A shows a state where each of the blades 21 is rotated by 90 degrees from the position above the groove 103. Until the blades 21 reach this state, the coals 106 in the storage silo 101 are raked by the blades 21 each curved in an arch shape. The raked coals 106 are collected along the curved surfaces of the blades 21 toward a center portion and discharged downward through the opening portion 60 where the groove closing plates 53, 55, 56, and 57 are not provided. Even in a case where the coals 106 raked until the blades 21 has been rotated by 90 degrees as shown in FIG. 9A are collected at base portions of the blades 21, the coals 106 are not discharged at portions where the groove closing plates 53, 55, 56, and 57 are provided. The coals 106 are discharged when they have been moved to the opening portion 60.

Therefore, the entire amount of coals raked by the blades 21 are not discharged to the groove 103, and the coals 106 other than the coals 106 discharged are moved in the rotational direction of the blades 21 on the groove closing plates 53, 55, 56, and 57.

FIG. 9B shows a state where each of the blades 21 is further rotated by 45 degrees from the state shown in FIG. 9A. In this state, the base portions of the blades 21 are located away from the position above the groove closing plates 53, 55, 56, and 57. Therefore, the coals 106 raked by the blades 21 are discharged through the opening portion 60. The coals 106 raked by tip end portions of the blades 21 are collected by curved front surfaces of the blades 21. The portion of the groove 103 except for the portion corresponding to the base portions of the blades 21 is closed by the groove closing plates 53, 55, 56, and 57. Therefore, the collected coals 106 are raked without being discharged to the groove 103.

FIG. 9C shows a state where each of the blades 21 is further rotated by 45 degrees from the state shown in FIG. 9B, that is, each of the blades 21 is further rotated by 90 degrees from the state shown in FIG. 9A. In this state, the coals 106 raked by the blades 21 and collected at the middle portions of the blades 21 are discharged through the opening portion 60. The coals 106 raked by the tip end portions of the blades 21 are loaded on the groove closing plates 53, 55, 56, and 57 and are not discharged to the groove 103. With this, even when the blades 21 are located above the groove 103, a large amount of coals 106 are prevented from being discharged through the groove 103 at once. The coals 106 mounted on the groove closing plates 53, 55, 56, and 57 are moved along the curved front surfaces of the blades 21 to the base portions while being caused to move toward an opposite side of the storage silo 101 across the groove 103 by the rotation of the blades 21. Although the coals 106 moved by the blades 21 also move in directions toward front and rear ends of the groove closing plates 53, the coals 106 are prevented from falling through the groove 103 by the leakage preventing plates 58 respectively provided at the conveying-direction front and rear ends of the groove closing plates 53. When the coals 106 moved by the blades 21 to the base portions reach the opening portion 60, the coals 106 are discharged downward through the groove 103.

Regarding the change in the amount of coals 106 raked by the blades 21 and the discharging of the raked coals 106 through the opening portion 60, changes occurring while the blades 21 rotate by 180 degrees are repeated since two blades 21 are provided so as to be symmetrical about the rotational center.

Figure 10:
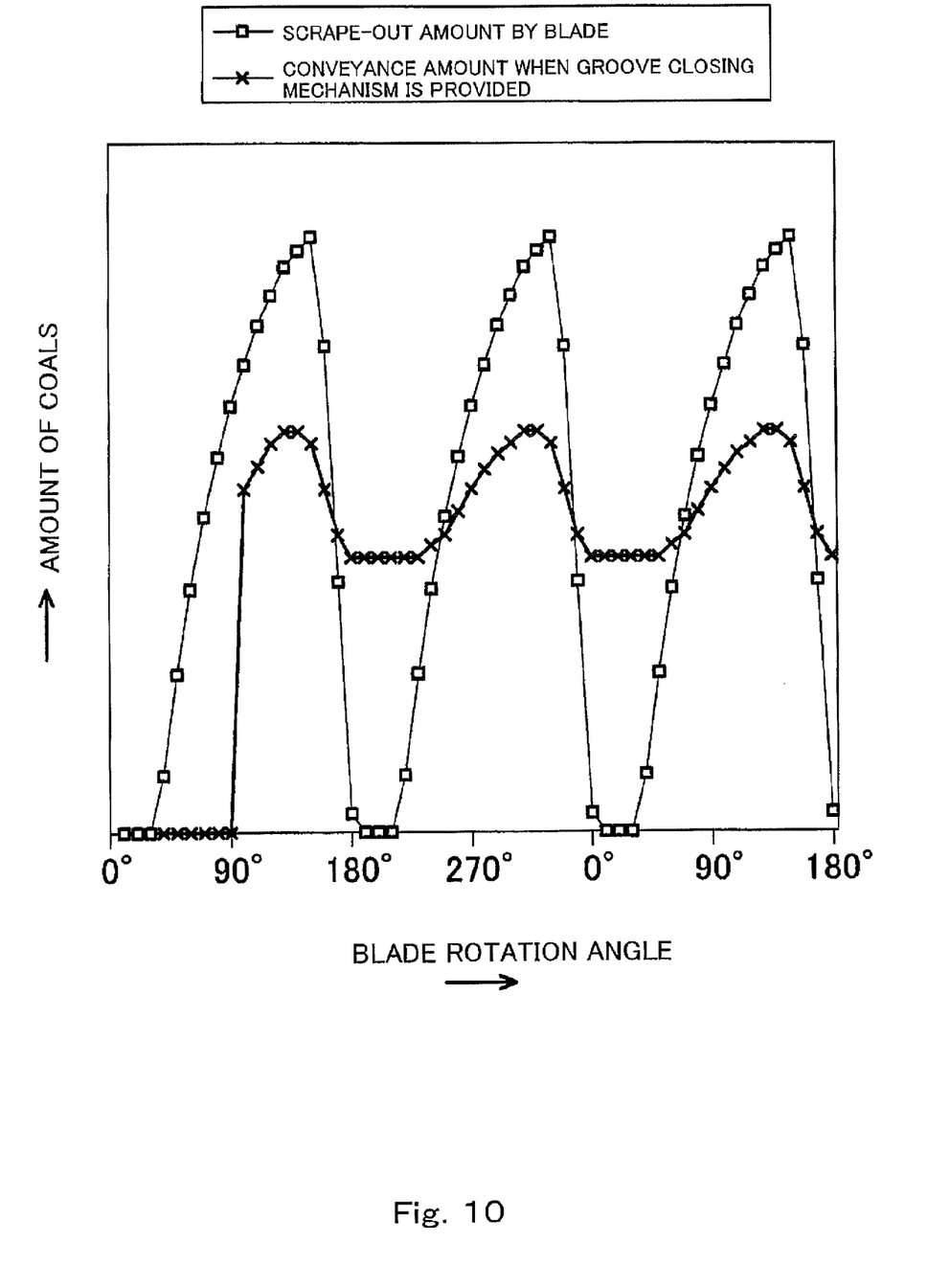
FIG. 10 is a graph showing predictions regarding the change in the scrape-out amount and the change in the conveyance amount due to the discharge device according to the present invention.

FIG. 10 is a graph showing the change in the scrape-out amount of the movable discharge device 1 including the groove closing mechanisms 50 and the change in the conveyance amount of the belt conveyor 105. According to the movable discharge device 1, the scrape-out amount of coals 106 by two blades 21 and the conveyance amount (coal amount) of coals 106 by the belt conveyor 105 respectively become the amounts shown in FIG. 10. FIG. 10 shows the changes in a case where the blades 21 are rotated from a stop state. A horizontal axis denotes the blade rotation angle as with FIG. 12 described above, and a vertical axis denotes the change in the coal amount. Since the change in the scrape-out amount of the blades 21 is the same as the conventional amount shown in FIG. 12 described above, an explanation thereof is omitted.

As shown in FIG. 10, according to the movable discharge device 1, the amount of coals 106 raked by the blades 21 increases as the rotation angle increases, and the scrape-out amount becomes maximum immediately before two blades 21 are located above the groove 103. However, the conveyance amount of the belt conveyor 105 becomes maximum when the blades 21 are rotated by about 140 degrees. This is because the coals 106 raked by the blades 21 are mounted the groove closing plates 53, 55, 56, and 57, and then are gradually discharged through the groove 103 by the rotation of the blades 21. Thereafter, the conveyance amount gradually decreases. In this example, the conveyance amount becomes minimum when the blades 21 are rotated by about 190 degrees.

After that, when the coals 106 raked by the blades 21 are accumulated on the front surfaces of the blades 21, the coals 106 mounted on the groove closing plates 53, 55, 56, and 57 are pushed to be discharged through the groove 103. With this, the conveyance amount of the belt conveyor 105 increases, but does not significantly increase or decrease. Thus, a significant change in the conveyance amount is suppressed. As above, after a part of the coals 106 raked by the blades 21 are mounted on the groove closing plates 53, 55, 56, and 57, those coals 106 are discharged through the groove 103. Thus, the amount of coals conveyed by the belt conveyor 105 can be restricted to the amount whose significant change is suppressed. In this example, regarding the change in the conveyance amount of the belt conveyor 105, since two blades 21 are provided so as to be opposed to each other about the rotation axis, the above-described change in the conveyance amount occurs every 180 degrees. However, the conveyance amount can be set to the amount whose significant change is suppressed.

Regarding the change in the conveyance amount of coals 106 shown in FIG. 10, the opening portion 60 formed by the groove closing plates 53, 55, 56, and 57 at the conveying-direction front position and the opening portion 60 formed by the groove closing plates 53, 55, 56, and 57 at the conveying-direction rear position are set to be different from each other (the state shown in FIG. 8C). With this, the coals 106 scraped out at the conveying-direction rear position and the coals 106 scraped out at the conveying-direction front position can be caused to respectively fall onto positions on the belt conveyor 105, the positions being different from each other in the conveying direction. With this, the amount of coals on the belt conveyor 105 can be further flattened, and the coals 106 can be conveyed more stably.

As above, according to the movable discharge device 1, the change in the coal amount (particle/bulk material amount) scraped out downward through the groove 103 of the storage silo 101 can be suppressed. Therefore, the change in the amount of coals conveyed by the belt conveyor 105 can be suppressed. Thus, the coals 106 can be stably discharged from the storage silo 101.

According to the above embodiment, the sizes of the groove closing plates 53, 55, 56, and 57 are set to be different from one another, and the groove closing plates 53, 55, 56, and 57 can be combined with one another. Therefore, the area of the opening portion 60 can be easily changed by changing the combination of the groove closing plates 53, 55, 56, and 57 or the attachment positions of the groove closing plates 53, 55, 56, and 57. Thus, the conveyance amount of particle/bulk material on the belt conveyor 105 can be flattened depending on various particle/bulk material, and the operation of stably discharging the particle/bulk material can be performed.

The above embodiment has been explained using the storage silo 101 for the coal as an example. However, the above embodiment is applicable to the storage silo 101 for the other particle/bulk material in the same manner as above. The groove closing mechanism 50 may be set depending on the property of the particle/bulk material to be stored, and the storage silo is not limited to the storage silo 101 for the coal.

The foregoing has explained an example of the groove closing mechanism 50 having a separable structure in which the groove closing plates 53, 55, 56, and 57 are detachable. However, the groove closing mechanism 50 may be configured to be able to change the opening area by sliding the groove closing plates in the traveling direction. The groove closing mechanism is not limited to the above configuration.

Further, the above-described embodiment is just one example, and various modifications may be made within the spirit of the present invention. The present invention is not limited to the above-described embodiment.

Industrial Applicability

The movable discharge device for use in the particle/bulk material storage silo according to the present invention can stably discharge the particle/bulk material while suppressing the change in the discharge amount of particle/bulk material discharged from the storage silo. Therefore, the movable discharge device according to the present invention can be utilized as, for example, a discharge device for discharging coals from a large-scale storage silo in a thermal power facility.

Reference Signs List 1 movable discharge device
10 travel body
20 scrape-out unit
21 blade
22 driving machine
23 reducer
24 rotational center
25 rotation trajectory region
30 hopper
31 suspending frame
32 suspending member
33 hopper frame
34 hopper main body
35 hopper gate
36 hopper support shaft
39 baffle plate
50 groove closing mechanism
51 support bracket
52 leg member
53 groove closing plate
54 plate member
55 to 57 groove closing plate
58 leakage preventing plate
60 to 63 opening portion
101 storage silo
102 cone portion
103 groove
105 belt conveyor
106 coal (particle/bulk material)
107 chute
X conveying direction

The invention claimed is:

1. A movable discharge device for use in a particle/bulk material storage silo, the movable discharge device being configured to travel along a groove provided at a lower portion of the storage silo and discharge particle/bulk material in the storage silo downward through the groove,
the movable discharge device comprising:
a travel body configured to travel along the groove;
a scrape-out unit configured to move integrally with the travel body and including a blade configured to rotate above the groove to rake the particle/bulk material in the storage silo and scrape out the particle/bulk material to the groove; and
a groove closing mechanism configured to close a predetermined region of the groove within a rotation trajectory region of the blade, wherein
the groove closing mechanism includes groove closing plate sets configured to respectively close conveying-direction front and rear portions of the groove within the rotation trajectory region of the blade; and
each of the groove closing plate sets includes a plurality of groove closing plates that close the predetermined region of the groove.

2. The movable discharge device according to claim 1, wherein the blade is one of two blades provided so as to be symmetrical about a rotational center of the two blades.

3. The movable discharge device according to claim 2, wherein each of the groove closing plate sets includes a plurality of groove closing plates having different areas for closing the groove from one another.

4. The movable discharge device according to claim 2, wherein the groove closing plate sets are configured to respectively have such sizes that opening areas are respectively formed at conveying-direction front and rear positions of the rotational center of the blades so as to be symmetrical about the rotational center.

5. The movable discharge device according to claim 2, wherein each of the groove closing plate sets includes groove closing plates having such sizes that a predetermined opening area is formed at an arbitrary position within the rotation trajectory region of the blades.

6. The movable discharge device according to claim 2, wherein the groove closing plate sets include leakage preventing plates respectively located at conveying-direction front and rear ends and projecting upward from upper surfaces of the groove closing plate sets.

7. A particle/bulk material storage silo comprising the movable discharge device according to claim 1.

* * * * *